United States Patent Office 3,306,972
Patented Feb. 28, 1967

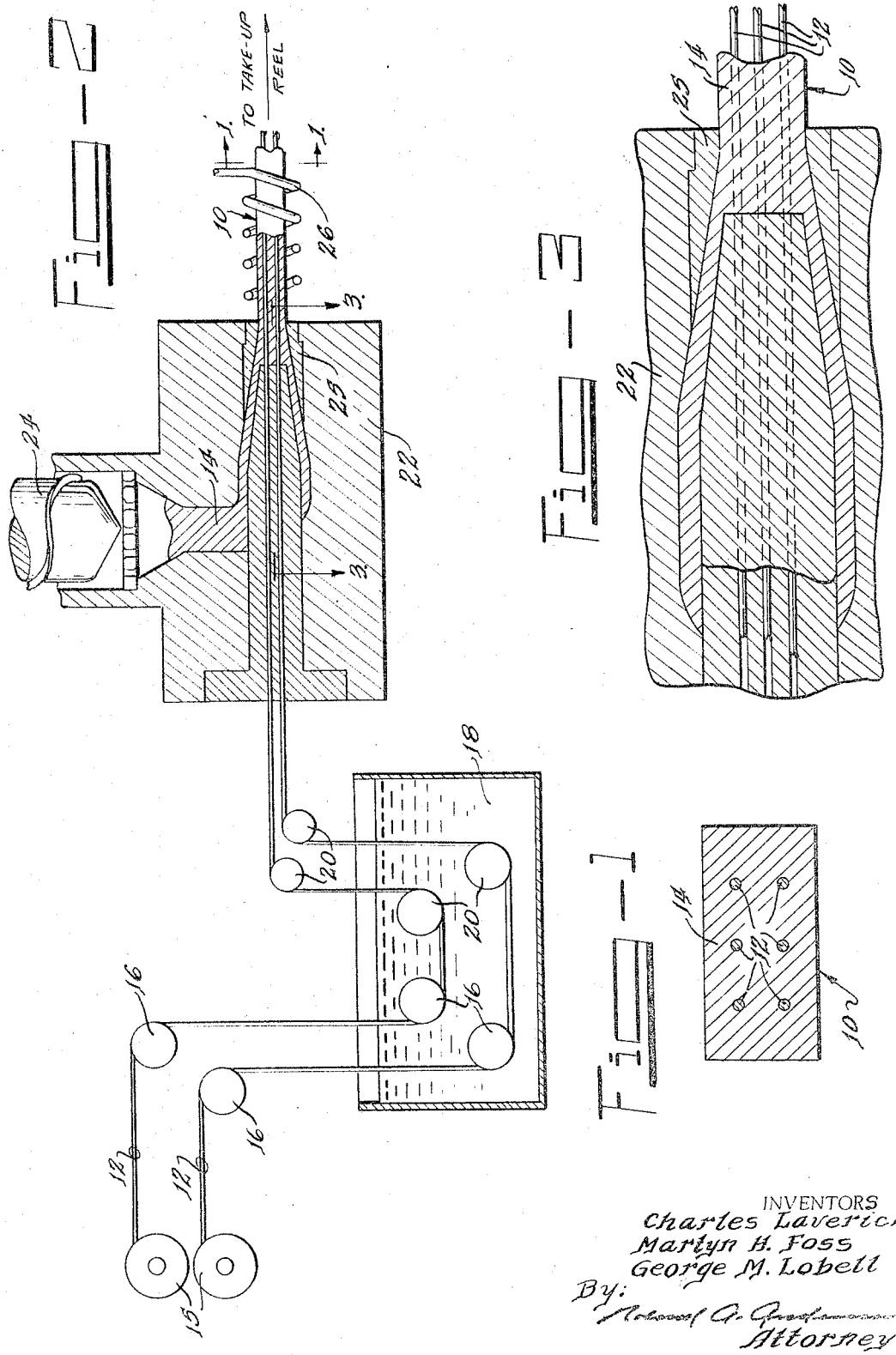

3,306,972
SUPERCONDUCTING CABLE
Charles Laverick, Downers Grove, Ill., Martyn H. Foss, Pittsburgh, Pa., and George M. Lobell, Oak Forest, Ill., assignors to the United States of America as represented by the United States Atomic Energy Commision
Filed Oct. 29, 1964, Ser. No. 407,606
4 Claims. (Cl. 174—126)

The invention described herein was made in the course of, or under, a contract with the U.S. Atomic Energy Commission.

The present invention relates to superconductors and more particularly to a new superconducting cable.

As the requirements for larger electromagnets with higher fields increase, the importance of superconducting magnets increases. Present superconducting magnets are manufactured using 10-mil niobium-zirconium wire coated with ¾ mil of copper which in turn is coated with 1 mil of organic insulation. Niobium-titanium or niobium-tin may be substituted for the niobium-zirconium. The 10-mil wire is generally considered to be optimum in size for a superconductor being used in a magnet. If the diameter of the wire is decreased, the current density in the wire goes up, but the cost and difficulty in winding the magnet increase so rapidly as to remove any advantage therefrom. If the diameter of the wire is increased, the current density in the wire decreases and the performance of the magnet decreases because the current-carrying capacity thereof decreases.

Though the 10-mil wire is considered in the art to be optimum, many disadvantages exist therefor. The diameter of the wire is small enough such that when it is wound in a magnet, mechanical failures and breakages are quite common, thereby making the manufacture of a magnet, particularly a large magnet, difficult. Since the diameter is small, manufacture of any large size magnet requires a large number of turns resulting in the creation of high inductance which is undesirable in energy storage and charging up of the superconducting magnet. Further, in large superconducting magnets wherein 10-mil wire is used, a large number of superconducting joints in the wire is necessitated, which joints increase the difficulty of manufacture. The organic insulation acts to decrease the charge time constant of the magnet. However, it results in poor cooling for any superconducting magnet made therewith and gives rise to a higher probability of mechanical breakdown of the insulation with corresponding electrical breakdown of the magnet. When 10-mil niobium-zirconium wire is used in a superconducting magnet, the turns thereof have a tendency to move during charging of the magnet. This movement of the turns limits the maximum current capacity of the magnet. It is generally believed that the maximum current that can be carried by a conductor in large magnets is 20 amperes and beyond that the superconductor will return to its normal region.

Accordingly, it is one object of the present invention to provide an improved superconducting conductor.

It is another object of the present invention to provide an improved conductor for use in a superconducting electromagnet.

It is another object of the present invention to provide a superconducting conductor having a high degree of mechanical rigidity when formed into windings.

It is another object of the present invention to provide a superconducting conductor having improved thermal conductivity.

It is another object of the present invention to provide a superconducting conductor having slow or negligible normal region propagation characteristics.

It is yet another object to provide a superconducting conductor capable of carrying currents approaching in value the short-sample characteristics thereof.

Other objects of the present invention will become more apparent as the detailed description proceeds.

In general the present invention comprises a plurality of wires spatially mounted with respect to each other, each of said wires having hard superconducting properties. A coating is disposed about said wires to form a superconducting cable having a rectangular cross section. The coating is a metal having high thermal and electrical conductivity at liquid helium temperatures.

Further understanding of the present invention may best be obtained from consideration of the accompanying drawings wherein:

FIG. 1 is a cross-sectional view of a preferred superconducting cable according to the present invention.

FIG. 2 is a schematic of an apparatus used in constructing the cable of FIG. 1.

FIG. 3 is a sectional view of a part of the apparatus of FIG. 2 taken along line 3—3 thereof.

Figure 4:
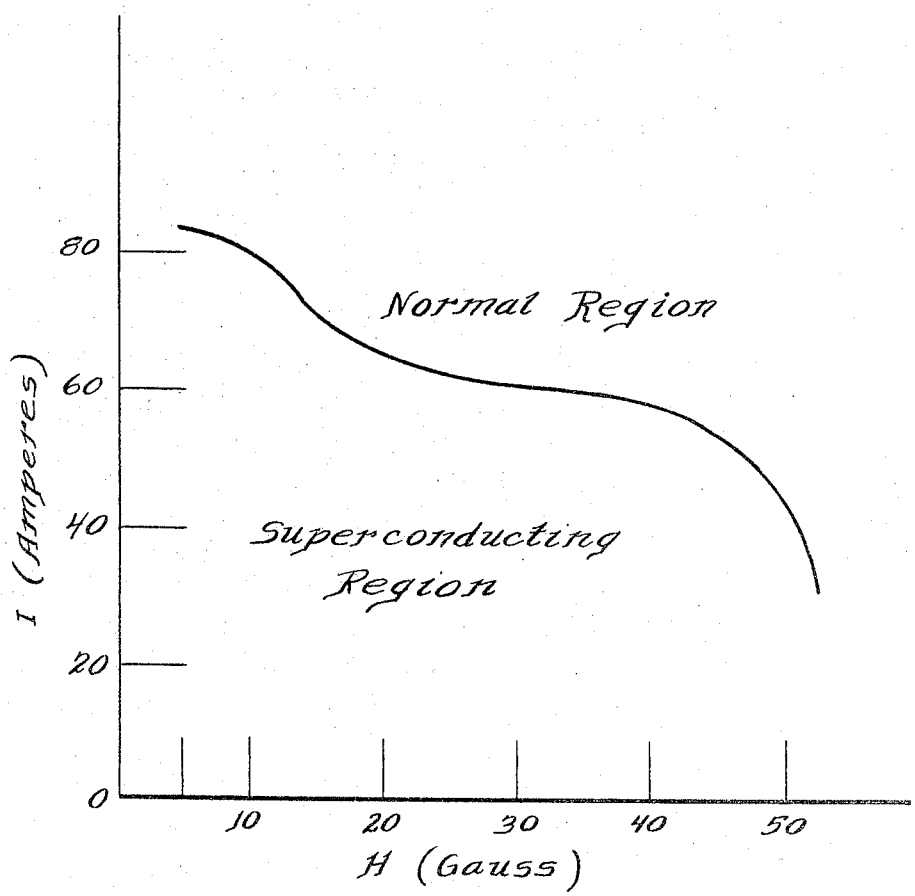
FIG. 4 is a graphical plot of the short-sample characteristics of an alloy having a composition of niobium and 25% by atomic weight zirconium.

In FIG. 1, a cross section of a preferred cable for the present invention is shown. The cable 10 comprises hard superconductors 12 embedded in a coating 14 having high electrical and mechanical conductivity at liquid helium temperatures. The coating 14 is essentially rectangular in cross section and the superconductors 12 embedded therein have a rectangular spatial configuration.

The essentially rectangular cross section of the coating 14 acts to give greater mechanical rigidity to the cable when formed into a winding and prevents movement of the turns thereof so formed in the winding. The rectangular spatial configuration of the superconductors 12 is preferred where a magnet is desired having high uniformity in its field. Further, it is desirable that the spacing between the superconductors 12 be uniform since, when the superconductors 12 are returning to normal with the coating 14 acting as an electrical shunt, nonuniformity in spacing increases the probability of hot spots developing in the cable via electrical heating.

It is to be understood that the superconductors 12 may be in spatial arrangements within the coating 14 other than that illustrated in FIG. 1. As previously stated, the rectangular configuration of the superconductors 12 in FIG. 1 is desirable when high uniformity in fields is desired. Otherwise, the superconductors 12 may be formed into other patterns both regular and irregular in shape. Further, though the embodiment of FIG. 1, is shown using only single-strand wire for each superconductor 12, multistrand wires may be used for each superconductor.

To further understanding of the construction of the present invention, a description of a process for the manufacture thereof will be given. FIGS. 2 and 3 illustrate a general process whereby the cable of the present invention may be manufactured. The superconductors 12 are fed from spools 15 via roller guides 16 into an acid etching bath 18. The bath 18 cleans the superconductors 12 and contains lactic acid, hydrofluoric acid and fuming nitric acid. From the bath 16, guide rollers 20 feed the superconductors 12 into an extrusion die holder 22. The guide rollers 20 and a take-up reel (not shown) keep the superconductors 12 under tension and in the desired spatial configuration while the coating 14 is applied thereto. The die holder 22 is electrically heated and the metal coating 14, heated to a plastic consistency, is forced into the die holder 22 and in contact with the superconductors 12 via screw feed 24. Adhesion of the metal coating 14 to the superconductors 12 may be improved by preheating the wire before it passes into the die holder 22. Extrusion die 25, mounted in the die holder 22, forms the desired cross-sectional shape for the cable 10. A water-cooled coil 26 cools the cable as it leaves the die 25.

There are two limitations on the thickness of the coating 14 which may be used with the cable 10 of the present invention. First, the minimum thickness of the coating 14 must be such that the cable coating 14 can withstand the shunt current it is required to carry when the cable goes normal. Second, is the packing factor of the windings formed with the cable. The thickness of the coating 14 cannot be so great as to interfere with the ability of the windings to generate the desired field.

Using superconducting cable constructed according to the present invention, one may achieve currents flowing in the individual superconductors which approach the short-sample characteristic for the particular superconductor. In FIG. 4, a graphical plot is shown of the short-sample characteristic of an alloy whose composition is niobium and 25% by atomic weight zirconium. With a cable having 0.1" x .06" aluminum coating on six 10-mil niobium-zirconium conductors constructed as shown in FIG. 1, the following currents are obtainable. With a 10 kilogauss center of field, 60 amperes per 10-mil niobium-zirconium conductor. With a 35 kilogauss center of field, 40 amperes per 10-mil niobium-zirconium conductor. Thus, the short-sample characteristic of individual superconductors is approached. The above figures are to be contrasted with the amperages obtained from standard 10-mil niobium-zirconium wire with a ¾-mil copper coat and 1-mil organic coat. With the 10-mil organic-copper-coated niobium-zirconium wire, 10–20 amperes are obtained with both a 10- and 35-kilogauss field.

As previously stated, the superconductors 12 within the cable 10 are hard superconductors such as niobium-zirconium, niobium-tin and niobium-titanium. The coating 14 is a metal having high thermal and electrical conductivity at liquid helium temperatures such as aluminum, cadmium, lead, indium and copper.

Persons skilled in the art will, of course, readily adapt the general teachings of the invention to embodiments far different than the embodiments illustrated. Accordingly, the scope of the protection afforded the invention should not be limited to the particular embodiments illustrated in the drawings and described above, but should be determined only in accordance with the appended claims.

The embodiments of the invention in which an exclusive property or privilege is claimed are defined as follows:

1. A superconducting cable comprising a plurality of bare superconducting wires spatially mounted with respect to each other, each of said wires being formed of an alloy selected from the class consisting of niobium-zirconium, niobium-tin, and niobium-tetanium, and a metal coating disposed about said wires to form a superconducting cable essentially rectangular in cross section, said metal coating having high thermal and electrical conductivity at liquid helium temperatures.

2. The cable according to claim 1 wherein said wires are uniformly distributed within said coating in a rectangular configuration.

3. A superconducting cable comprising six bare superconducting wires spatially mounted with respect to each other in a rectangular configuration, each of said wires being formed of an alloy selected from the class consisting of niobium-zirconium, niobium-tin, and niobium-titanium, and a metal coating disposed about said wires to form a superconducting cable essentially rectangular in cross section, said metal coating having high thermal and electrical conductivity at liquid helium temperatures.

4. The cable of claim 3 wherein said wires are 10 mils in diameter, said metal coating has an outside dimension of approximately 0.06 inch by 0.1 inch and said wires are uniformly disposed therein in a rectangular configuration.

References Cited by the Examiner

UNITED STATES PATENTS

| | | | |
|---|---|---|---|
| 294,538 | 3/1884 | Waring | 174—104 |
| 294,545 | 3/1884 | Waring | 174—104 |
| 3,187,236 | 6/1965 | Leslie | 174 |
| 3,218,693 | 11/1965 | Allen | 174 |

LEWIS H. MYERS, *Primary Examiner.*

E. GOLDBERG, *Assistant Examiner.*